(12) United States Patent
Ohbo

(10) Patent No.: US 7,310,245 B2
(45) Date of Patent: Dec. 18, 2007

(54) ELECTRIC POWER TRANSMISSION DEVICE AND ELECTRIC POWER TRANSMISSION METHOD

(76) Inventor: Noboru Ohbo, 4-1-504, Nishiawaji 6-chome, Higashi-Yodogawa-ku, Osaka-shi, Osaka (JP)

( * ) Notice: Subject to any disclaimer, the term of this patent is extended or adjusted under 35 U.S.C. 154(b) by 0 days.

(21) Appl. No.: 11/112,074

(22) Filed: Apr. 22, 2005

(65) Prior Publication Data

US 2006/0239043 A1    Oct. 26, 2006

(51) Int. Cl.
*H02M 3/335* (2006.01)
*H02M 7/523* (2006.01)

(52) U.S. Cl. .................... 363/21.02; 363/17; 363/98
(58) Field of Classification Search ............ 363/21.02, 363/21.03, 24, 25, 97, 98, 131–134
See application file for complete search history.

(56) References Cited

U.S. PATENT DOCUMENTS

| | | | |
|---|---|---|---|
| 6,324,080 B1 * | 11/2001 | Laeuffer | ............... 363/25 |
| 6,344,979 B1 * | 2/2002 | Huang et al. | ............... 363/16 |
| 6,351,401 B1 * | 2/2002 | Scheel et al. | ............... 363/98 |
| 6,934,167 B2 * | 8/2005 | Jang et al. | ............... 363/21.02 |
| 7,242,594 B2 * | 7/2007 | Chan et al. | ............... 363/17 |

FOREIGN PATENT DOCUMENTS

WO    WO 98/34319    9/1998

* cited by examiner

*Primary Examiner*—Gary L. Laxton
(74) *Attorney, Agent, or Firm*—William L. Androlia; H. Henry Koda

(57) ABSTRACT

In an electric power transmission device in which a primary side power transmission coil (L1) and a secondary side power receiving coil (L2) are magnetically coupled, and electric power is transmitted from the primary side power transmission coil (L1) to the secondary side power receiving coil (L2) via a non-contact and out of touch, a capacitor (C1) is connected to the primary side power transmission coil (L1) in series, a voltage to be supplied to the primary side power transmission coil (L1) is converted into AC voltage and stepped up, and a series resonance circuit (7) including a mutual inductance (M) by the secondary side power receiving coil (L2) is formed; wherein a resonance point of the series resonance circuit (7) including the mutual inductance (M) by the secondary side power receiving coil (L2) is set to a frequency higher than a resonance point of a primary side series resonance circuit (6) which is composed of the primary side power transmission coil (L1) and the capacitor (C1), whereby a high electric power transmission efficiency of practical level can be obtained and thus reduction in size and weight and electric power saving can be easily realized with the high electric power transmission efficiency.

5 Claims, 11 Drawing Sheets

(a)

(b)

ELECTRIC POWER TRANSMISSION DEVICE AND ELECTRIC POWER TRANSMISSION METHOD

TECHNICAL FIELD

The present invention relates to an electric power transmission device and an electric power transmission method which can charge a secondary battery built into portable compact electronic equipment such as a cellular phone via non-contact and out of touch.

BACKGROUND ART

In such sort of an electric power transmission device, a primary side power transmission coil and a secondary side power receiving coil are magnetically coupled and electric power is transmitted from the primary side power transmission coil to the secondary side power receiving coil via non-contact and out of touch. As described above, there is a large problem in that the electric power transmission device utilizing electromagnetic induction must improve electric power transmission efficiency and transmission electric power and reduce electric power consumption. Techniques to solve such problems have been proposed. For example, International Publication No. 98/34319 discloses a technique in which a primary coil and a secondary coil use a cored coil and a capacitor is connected to the secondary coil in parallel to form a parallel resonance circuit; and since a frequency higher than a frequency of oscillation signal of the primary coil side is chosen as a resonant frequency of the secondary coil side, a capacitance can be reduced and a coupling coefficient between the primary coil and the secondary coil can be apparently increased, and therefore electric power transmission efficiency can be improved. In addition, there is disclosed another technique in which the presence or absence of a load is indirectly detected by a parameter variation in current or voltage generated in the primary coil; and electric power is continuously supplied to the primary coil in a complete operation mode when loading, and electric power is intermittently supplied to the primary coil in an intermittent operation mode for each predetermined timing during predetermined time when no-loading, thereby reducing electric power consumption.

DISCLOSURE OF INVENTION

Problem to be solved by the present invention is that in the known arts, since a level of voltage generated in a primary coil depends on a power source or a voltage of a signal source, a large voltage cannot be generated in the primary coil and electric power transmission efficiency of practical level cannot be obtained, thus reduction in size and weight and electric power saving cannot be realized.

The present invention is implemented in view of the foregoing, and it is an object to provide an electric power transmission device and an electric power transmission method which can obtain high electric power transmission efficiency of practical level and realize reduction in size and weight and electric power saving easily.

To attain the aforementioned object, the electric power transmission device according to the present invention magnetically couples a primary side power transmission coil to a secondary side power receiving coil and transmits electric power from the primary side power transmission coil to the secondary side power receiving coil via a non-contact and out of touch, the electric power transmission device comprising: a capacitor connected in series to the primary side power transmission coil, for converting a voltage which is to be supplied to the primary side power transmission coil into a AC voltage and being stepped up, and for configuring a series resonance circuit which includes a mutual inductance by the secondary side power receiving coil, wherein a resonance point of the series resonance circuit which includes the mutual inductance by the secondary side power receiving coil is set to a frequency higher than a resonance point of a primary side series resonance circuit which is composed of the primary side power transmission coil and the capacitor.

In one embodiment of the present invention, the electric power transmission device includes the capacitor which is arranged on the primary side power transmission coil in series, the number of the capacitor being one.

In one construction of the present invention, the electric power transmission device includes the capacitor which is arranged on the primary side power transmission coil in series, the number of the capacitor being two that sandwiches the primary side power transmission coil therebetween.

In one construction of the present invention, the electric power transmission device includes the primary side power transmission coil and the secondary side power receiving coil which are formed by a planate air-core coil.

In one construction of the present invention, the electric power transmission device includes the primary side power transmission coil and the secondary side power receiving coil which are formed by a planate air-core coil that is configured by a spirally wound litz wire with the number of winds of 10 or more and 50 or less on a plane surface.

In another construction of the present invention, the electric power transmission device includes phase detection means for detecting a phase of a voltage of the primary side power transmission coil; and control means for outputting a control signal to control the amount of electric power that is supplied to the primary side power transmission coil based on an output of the phase detection means, wherein the control means determines as no load when delaying in phase of a voltage of the primary side power transmission coil compared to a voltage to be supplied to the primary side power transmission coil, and determines as a foreign material load when advancing, at this time a first control signal for intermittently supplying electric power to the primary side power transmission coil at predetermined intervals during predetermined time only is outputted; and determines as a normal load when being in the same phase, and a second control signal for continuously supplying electric power to the primary side power transmission coil is outputted.

In still another construction of the present invention, the electric power transmission device includes amplitude detection means for detecting amplitude as well as the phase detection means for detecting a phase of a voltage of the primary side power transmission coil, wherein the control means determines as a foreign material load when a phase of a voltage of the primary side power transmission coil advances compared to a voltage to be supplied to the primary side power transmission coil and the amplitude is more than a predetermined reference value.

In yet another construction of the present invention, the electric power transmission device includes the phase detection means and the amplitude detection means which input a voltage of the primary side power transmission coil from the primary side power transmission coil side of the capacitor.

Also, the electric power transmission device includes the phase detection means and amplitude detection means which input a voltage of the primary side power transmission coil from an opposite side to the primary side power transmission coil of the capacitor via an another capacitor.

In an additional construction of the present invention, the electric power transmission device includes secondary side ID output means for being connected to the secondary side power receiving coil and for varying a load with respect to electric power based on a predetermined specific secondary side ID signal, wherein information transmission is performed to a primary side power receiving coil from the secondary side power receiving coil by load modulation, and the control means confirms a normal load based on information transmitted to the primary side power receiving coil.

Also, the electric power transmission device of the present invention, includes rectification means for rectifying an output voltage of the secondary side power receiving coil and smoothing means for smoothing a rectification output from the rectification means.

Still further, the electric power transmission method of the present invention magnetically couples a primary side power transmission coil to a secondary side power receiving coil and for transmitting electric power from the primary side power transmission coil to the secondary side power receiving coil via a non-contact and out of touch, wherein a capacitor is connected to the primary side power transmission coil in series, the number of the capacitor being one or two that sandwiches the primary side power transmission coil therebetween, a voltage which is to be supplied to the primary side power transmission coil is convened into a AC voltage and stepped up, and a series resonance circuit which includes a mutual inductance by the secondary side power receiving coil is formed, the series resonance circuit which includes the mutual inductance by the secondary side power receiving coil is resonated by the primary side power transmission coil, the secondary side power receiving coil, and the capacitor at a frequency higher than a resonance frequency of a primary side series resonance circuit which is composed of the primary side power transmission coil and the capacitor, and electric power is transmitted from the primary side power transmission coil to the secondary side power receiving coil.

According to the present invention, a large voltage can be generated in the primary side power transmission coil by a stepping up function of the capacitor connected to this coil in series without depending on a power source and a voltage of signal source. Further, in the primary side power transmission coil, only a minute current flows when no-loading by a resonance characteristics of the series resonance circuit including mutual inductance by the secondary side power receiving coil, and therefore a large current can be flown only when loading. Thus, high electric power transmission efficiency of practical level can be obtained and thus reduction in size and weight and electric power saving can be easily realized.

As to the present invention, it is enough to have one capacitor disposed in series on the primary side power transmission coil. However, in the present invention, the capacitor can be arranged on the primary side power transmission coil in series, the number of the capacitor being two that sandwiches the primary side power transmission coil therebetween, whereby voltages applied to respective capacitors can be divided to increase capacitor resistance.

When a cored coil is used in the primary side power transmission coil and secondary side power receiving coil, core loss including hysteresis loss and eddy-current loss is generated. The core loss is extremely dominant in the loss on the way of power transmission, thereby causing to remarkably degrade the electric power transmission efficiency. However, according to one construction of the present invention, a planate air-core coil is used in the primary side power transmission coil and secondary side power receiving coil, whereby the core loss can be structurally avoided and the electric power transmission efficiency can be spectacularly improved.

Further, according to the present invention, the primary side power transmission coil and secondary side power receiving coil use an air-core coil which is configured by a spirally wound litz wire with the number of winds of 10 or more and 50 or less on a plane surface, whereby skin effect and eddy-current loss can be remarkably reduced and direct current resistance element can also be remarkably reduced by coarse winding with small number of winds of 10 or more and 50 or less. Furthermore, the number of winds with the optimal efficiency (according to the applicant test, 18 to 20) can be selected, and therefore the electric power transmission efficiency can be improved.

According to the present invention, the presence or absence of a load as well as a normal load or foreign material load except the normal load are detected in the primary side, and electric power can be transmitted when only the normal load. For example, electric power is transmitted to a metal adjacent to the primary side power transmission coil so as to prevent the metal from being heated, and therefore useless electric power consumption can be suppressed and dangerousness due to unintentional power transmission can also be avoided.

Further, according to the present invention, a phase of voltage of the primary side power transmission coil as well as a foreign material load combined with amplitude are detected, thereby performing foreign material load detection with high accuracy.

In addition, according to the present invention, the phase detection means and amplitude detection means can input a voltage of the primary side power transmission toil from the primary side power transmission coil side of the capacitor. Further, according to the present invention, a voltage of the primary side power transmission coil can be inputted from an opposite side to the primary side power transmission coil of the capacitor via another capacitor. The presence or absence of a load can be determined by detecting an amount of current flowing through the primary side power transmission coil. In this case, an element with low resistance value such as a shunt resistor is required to be provided in the primary side, resulting in consumption of a part of electric power in first to produce joule loss, which electric power being transmitted to the secondary side power receiving coil. However, in another construction of the present invention, the presence or absence of a load as well as a normal load or foreign matter load are detected based on a phase and amplitude of a voltage of the primary side power transmission coil, whereby the detection can be performed with little consumption of electric power and degradation of the electric power transmission efficiency can be prevented.

According to still another construction of the present invention, ID authentication function for confirming the normal load R based on the information transmitted to the primary side power receiving coil can be added; and by this ID authentication function, when a specific load, for example, this device is used for a charger of a cellular phone, electric power can be transmitted to only the cellular phone made by a specific company (electric power is not transmitted to other companies' cellular phones having almost similar power receiving function), thereby improving safety in electric power transmission owing to non-contact and out of touch.

BRIEF DESCRIPTION OF DRAWINGS

FIG. 3(a) is a plan view, and FIG. 3(b) is a cross-sectional view.

BEST MODE FOR CARRYING OUT THE INVENTION

Figure 1:
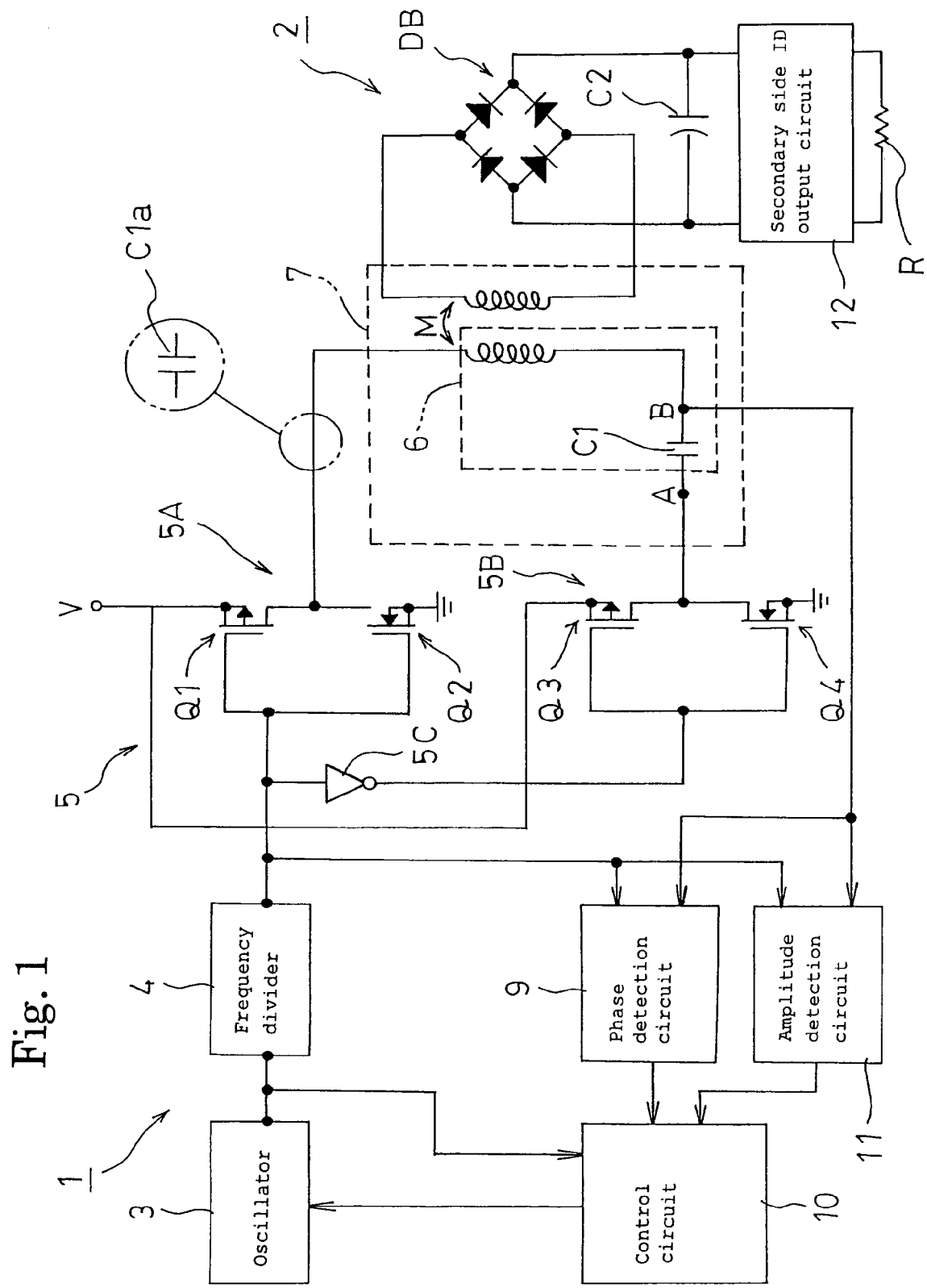
FIG. 1 is a circuit diagram showing an electric power transmission device according to an embodiment of the present invention.

An embodiment of the present invention will be described with reference to the accompanying drawings. As shown in FIG. 1, this embodiment is configured by a primary side power transmission section 1 having a primary side power transmission coil (referred to as "a primary coil" hereinafter) L1 and a secondary side power receiving section 2 having a secondary side power receiving coil (referred to as "a secondary coil" hereinafter) L2. The primary side power transmission section 1 includes an oscillator (OSC) 3, a frequency divider 4, a driving bridge circuit (switching circuit) 5 composed of two pairs of C-MOSFET (Complementary-Metal Oxide Semiconductor) circuits 5A and 5B, and the primary coil L1. In addition, the secondary side power receiving section 2 includes the secondary coil L2, a diode bridge DB for full wave rectification, a smoothing electrolytic capacitor C2, and a load R.

In the primary side power transmission section 1, the output of the oscillator 3 is connected to the frequency divider 4 and the output of the frequency divider 4 is connected to each of the C-MOSFET circuit 5A and 5B of a driving bridge circuit 5 via an inverter circuit 5C. Further, one end of the primary coil L1 is connected to the output of one C-MOSFET circuit 5A and the other end of the primary coil L1 is connected to the output of the other C-MOSFET circuit 5B.

In the secondary side power receiving section 2, the secondary coil L2 is magnetically coupled to the primary coil L1. The input of a diode bridge DB is connected to both ends of the secondary coil L2 and a smoothing electrolytic capacitor C2 and a load R are connected to the output of the diode bridge DB in parallel.

In the above-described configuration, a signal (a rectangular wave) of a predetermined frequency (a frequency of n times a resonance frequency of a series resonance circuit to be described later) outputted from the oscillator 3 is divided into 1/n by the frequency divider 4 and a frequency divided signal (a rectangular wave) of a predetermined frequency (the resonance frequency of the series resonance circuit to be described later) outputted from the frequency divider 4 is inputted to each of the C-MOSFET circuit 5A and 5B in a reverse phase by the inverter circuit 5C, whereby each of the C-MOSFET circuit 5A and 5B performs reverse operation. That is, each of the C-MOSFET circuits 5A and 5B is of a circuit configuration combined by a P channel MOSFET Q1 or Q3 and N channel MOSFET Q2 or Q4, respectively; and when the input (input of the P channel MOSFET Q1 and N channel MOSFET Q2) at one C-MOSFET circuit 5A side is at L (Low) level and when the input (input of the P channel MOSFET Q3 and N channel MOSFET Q4) at the other C-MOSFET circuit 5B side is at H (High) level, the P channel MOSFET Q1 and N channel MOSFET Q4 are in ON state and the N channel MOSFET Q2 and P channel MOSFET Q3 are in OFF state, and therefore the output of one C-MOSFET circuit 5A is connected to a direct current power source V1 (+5) by the P channel MOSFET Q1 to be at H level and the output of the other C-MOSFET circuit 5B is connected to the ground by the N channel MOSFET Q4 to be at L level. Consequently, a current flows through the primary coil L1 in the forward direction. When the input of each C-MOSFET circuit 5A and 5B is reversed, the P channel MOSFET Q1 and N channel MOSFET Q4 are in OFF state and the N channel MOSFET Q2 and P channel MOSFET Q3 are in ON state, and therefore the output of one C-MOSFET circuit 5A is connected to the ground by the N channel MOSFET Q2 to be at L level and the output of the other C-MOSFET circuit 5B is connected to the direct current power source V1 (+5) by the P channel MOSFET Q3 to be at H level. Consequently, a current flows through the primary coil L1 in the reverse direction. In this way, when alternating current electric power (high frequency electric power) is supplied to the primary coil L1 by switching operation in which two pairs of C-MOSFET circuit 5A and 5B perform ON-OFF alternatively based on the predetermined frequency signal outputted from the oscillator 3, a counter electromotive force (mutual inductive electromotive force) is generated by electromagnetic induction in the secondary coil L2. Alternating current electric power induced (transmitted) in this secondary coil L2 is performed by full wave rectification with the diode bridge DB, smoothed by the electrolytic capacitor C2, and converted into direct current electric power and this direct current electric power is supplied to the load R. In addition, in the C-MOSFET circuit 5A and 5B, the P channel MOSFET Q1 and Q3 and the N channel MOSFET Q2 and Q4 are not in ON state simultaneously, thus a feed through current is not generated. Further, since driving control is performed by only voltage, electric power is not consumed in controlling.

As described above, the electric power transmission device is configured so that the primary coil L1 and secondary coil L2 are magnetically coupled and electric power is transmitted from the primary side power transmission coil L1 to the secondary side power receiving coil L2 via a non-contact and out of touch. Further, the primary side power transmission section 1 includes feeding means such as the driving bridge circuit 5 for supplying electric power to the primary coil L1 and oscillating means such as the oscillator 3 for supplying the predetermined frequency signal, which signal being for driving control of the feeding means, to the feeding means. In addition, the secondary side power receiving section 2 includes rectification means such as diode bridge DB composed of diodes for rectifying the output voltage of the secondary coil L2 to supply direct current electric power to the load R and smoothing means composed of capacitor C2 for smoothing the rectified output (a pulsating current) from the rectification means. In such an electric power transmission device, for example, the primary side power transmission section 1 is incorporated with a power source circuit in which the commercial power source is stepped down, rectified, smoothed, and stabilized, on a charging rack at which a cellular phone is positioned and placed, so as to supply direct current to the primary side power transmission section 1 by the commercial power source; and the secondary side power receiving section 2 is incorporated with a secondary battery in a cellular phone and the secondary battery is connected to the secondary coil L2 as the load R via the diode bridge DB and the electrolytic capacitor C2, and therefore, a non-contact and out of touch type charging rack for cellular phones can be configured.

The primary side power transmission section 1 of the electric power transmission device configured as described above, as shown in FIG. 1, includes a capacitor C1 connected to the primary coil L1 in series, makes a voltage, which is to be supplied to the primary coil L1, convert into a AC voltage and step up, and constitutes, combining with the primary coil L1, a primary side series resonance circuit (primary side series resonance circuit not including a mutual inductance M by the secondary coil L2) 6 and a whole series resonance circuit 7 including a mutual inductance M by the secondary coil L2, whereby it is configured so that alternating current electric power (high frequency electric power) can be supplied to the primary coil L1 via the capacitor C1. The capacitor C1 is arranged between the output of either C-MOSFET circuit 5A or 5B and the connection end of the primary coil L1 with respect to the output with one capacitor, i.e., arranged on the minus side of the primary coil L1 in series with one capacitor. In addition, as shown by imagination line in FIG. 1, capacitors C1 and C1$a$ arranged between the output of each of the C-MOSFET circuits 5A and 5B and each of the connection ends of the primary coil L1 with respect to the output with one capacitor each are preferable, that is, two capacitors arranged on both sides of the primary coil L1 in series sandwiching the primary coil L1 are preferable. Although one capacitor and two capacitors are electrically equivalent, in the case of two capacitors, the capacitors C1 and C1$a$ having doubled electrostatic capacity for each are arranged so that the applied voltages can be divided to increase capacitor resistance, thereby enabling to reduce degradation.

Figure 2:
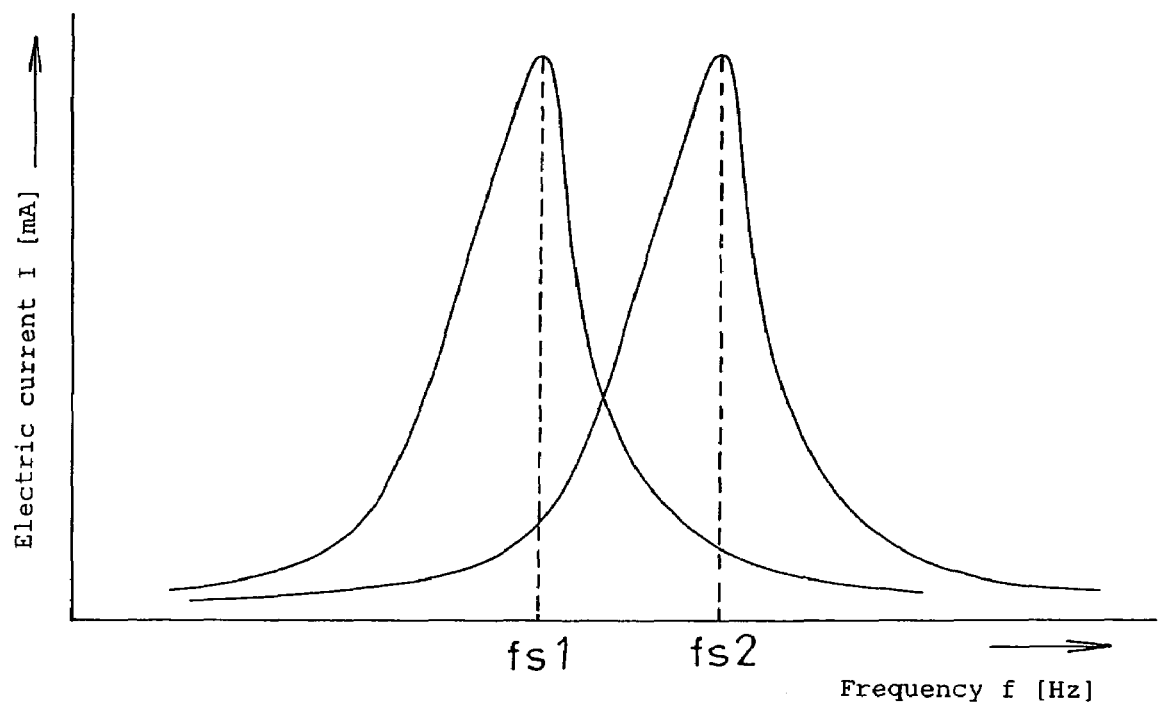
FIG. 2 is a diagram showing resonance characteristics of a series resonance circuit.

Then, as shown in FIG. 2, a resonance point (a resonance frequency fs2) of the series resonance circuit 7 including the mutual inductance M by the secondary coil L2 is set to be a frequency (fs1<fs2) which is higher than a resonance point (a resonance frequency fs1) of the primary side series resonance circuit 6 composed of the primary coil L1 and capacitor C1 (or capacitor C1, C1$a$). Further, the primary coil L1, secondary coil L2, and capacitor C1 (or capacitor C1, C1$a$) having electrical characteristics such as resonance characteristics of the series resonance circuit 7 are selectively used.

In the configuration as described above, the oscillation frequency of the oscillator 3 is set so that the oscillation frequency of a frequency divided signal outputted from the frequency divider 4 becomes the resonance frequency (fs2) of the series resonance circuit 7 including the mutual inductance M by the secondary coil L2, and the primary side series resonance circuit 6 and series resonance circuit 7 are driven via the driving bridge circuit 5, whereby only a minute current flows in the primary coil L1 because of largely being out of the resonance point of the primary side resonance circuit 6 when no-loading being absence of the load R. On the other hand, a large current flows in the primary coil L1 because of becoming the resonance point of the series resonance circuit 7 when loading being presence of the load R.

Accordingly, the electric power transmission device configured as described above, a large voltage can be generated in the primary coil L1 by a stepping up function of the capacitor C1 (or capacitor C1, C1$a$) connected to this coil in series without depending on the power source and the voltage of signal source. Further, in the primary coil L1, only a minute current flows when no-loading by the resonance characteristics of the series resonance circuit 7 including mutual inductance M by the secondary coil L2, and therefore a large current can be flown only when loading. Thus, high electric power transmission efficiency of practical level can be obtained and thus reduction in size and weight and electric power saving can be easily realized.

Figure 3:
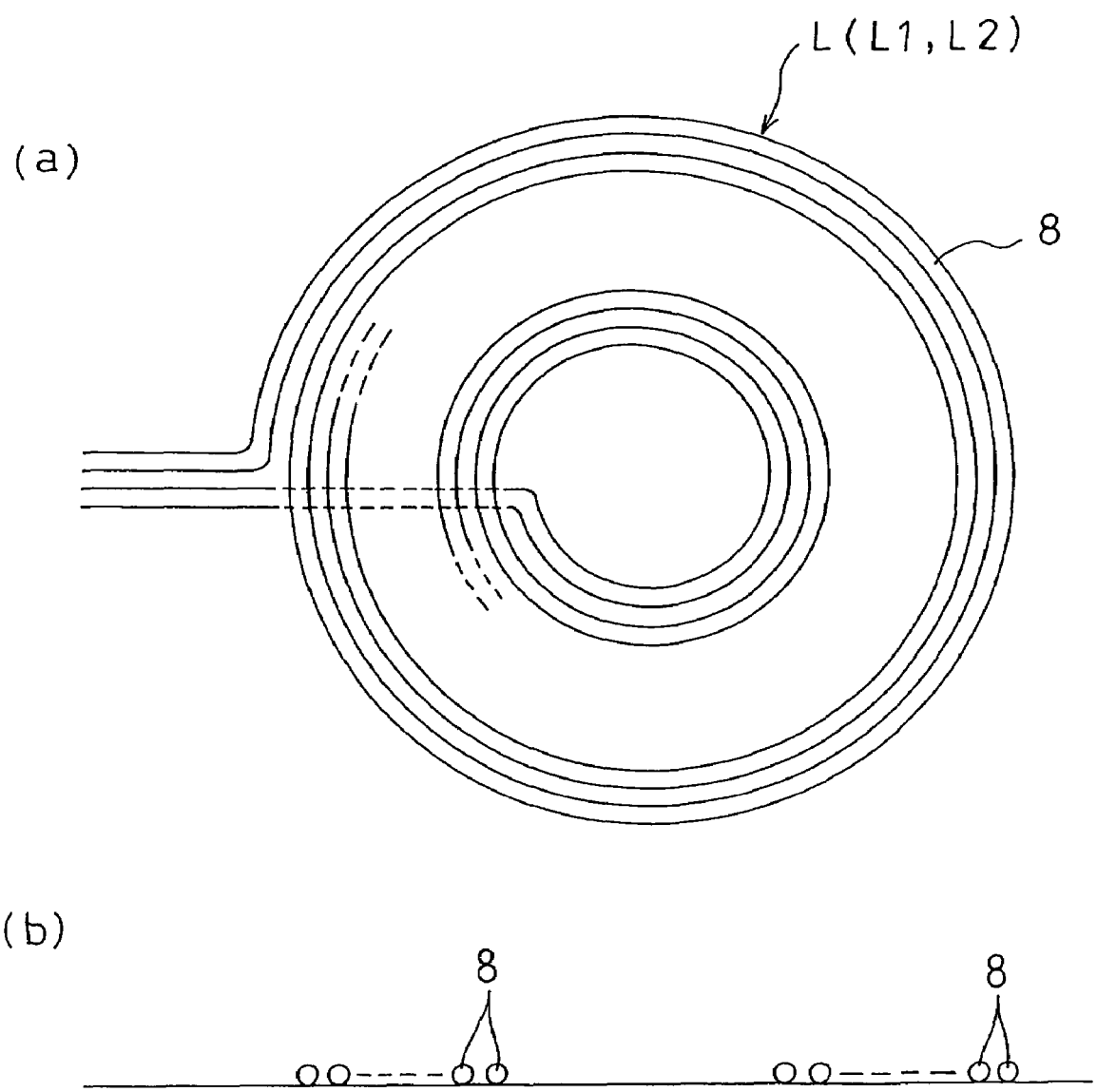
FIG. 3 is a circuit diagram showing the construction of a primary coil and a secondary coil.

The primary coil L1 and secondary coil L2 of the electric power transmission device configured as described above, are of planate air-core coil as shown in FIG. 3. When a cored coil is used in the primary coil L1 and secondary coil L2, core loss including hysteresis loss and eddy-current loss is generated. The core loss is extremely dominant in the loss on the way of power transmission, thereby causing to remarkably degrade the electric power transmission efficiency. However, when a planate air-core coil L is used, the core loss can be structurally avoided and therefore the electric power transmission efficiency can be spectacularly improved.

The planate air-core coil L is configured by a spirally wound litz wire 8, which is stranded with a plurality of copper wires or enamel wires, with the number of winds of 10 or more and 50 or less on a plane surface. When such planate air-core coil L is used in the primary coil L1 and secondary coil L2, skin effect and eddy-current loss can be remarkably reduced and direct current resistance element can also be remarkably reduced by coarse winding with small number of winds of 10 or more and 50 or less. Furthermore, the number of winds with the optimal efficiency (according to the applicant's test, 18 to 20) can be selected, and therefore the electric power transmission efficiency can be improved.

Regarding the electric power transmission device (circuit of FIG. 1) configured as described above, the applicant conducted an electric power transmission efficiency test and obtained the following results.

[Test 1]

The primary coil L1 and secondary coil L2 were wound by litz wire 8 composed of 20-ply copper wire each having 0.1 mm on a surface in a circular form and spirally wound with the number of winds of 20. In consideration of being incorporated in a cellular phone, a planate air-core coil configured to have an outer diameter of 30 mm and an inner air-core diameter of 7 mm was used for the secondary coil L2. The measured inductance of the primary coil L1 was 10 µH, and the direct current resistance was 0.2Ω. When the electrostatic capacity of the capacitor C1 is 0.03 µF, from the equation $\omega=1/\sqrt{LC}$, the resonance frequency (resonance point) fs1 of the primary side series resonance circuit 6 is derived as 290 KHz. However, in consideration of the mutual inductance M by the secondary coil L2, when the driving frequency of the primary side series resonance circuit 6 is set at 400 KHz (fs2) which frequency is higher than the resonance frequency (resonance point) fs1 of the primary side series resonance circuit 6, the consumption current including the oscillation circuit 3 and frequency divider 4 of the primary side power transmission section 1 is lowered to approximately 100 mA. Under this condition, the test was conducted while the secondary coil L2 was overlappingly close to the primary coil L1 with 2 mm spacing, the results were:

the primary side 5V 1 A 5×1=5 W the secondary side the load resistance 10Ω 6V 600 mA 6×0.6=3.6 W accordingly, the electric power transmission efficiency of DC to DC was 3.6÷5=72%.

In the case of [Test 1], when the diode bridge DB and the electrolytic capacitor C2 of the secondary side power receiving section 2 were removed and the load R was directly connected to the secondary coil L2, the primary side 5V 1 A 5×1=5 W the secondary side the load resistance 10Ω AC voltage execution value 6.36V 6.36×6.36÷10≈4 W accordingly, the electric power transmission efficiency of DC to AC was 4÷5=80%.

[Test 2]

The primary coil L1 was wound by litz wire 8 composed of 15-ply copper wire each having 0.1 mm on a surface in a circular form and spirally wound with the number of winds of 20 and a planate air-core coil configured to have an outer diameter of 25 mm and an inner air-core diameter of 5 mm is used. The secondary coil L2 was wound by litz wire 8 composed of 15-ply copper wire each having 0.1 mm on a surface in a circular form and spirally wound with the number of winds of 15 and a planate air-core coil configured to have an outer diameter of 20 mm and an inner air-core diameter of 5 mm is used. The measured inductance of the primary coil L1 was 8 µH, and the direct current resistance element was 0.2Ω. When the electrostatic capacity of the capacitor C1 is 0.03 µF, from the equation $\omega=1/\sqrt{LC}$, the resonance frequency (resonance point) fs1 of the primary side series resonance circuit 6 is derived as 24 KHz. However, in consideration of the mutual inductance M by the secondary coil L2, when the driving frequency of the primary side series resonance circuit 6 is set at 440 KHz (fs2) which frequency is higher than the resonance frequency (resonance point) fs1 of the primary side series resonance circuit 6, the consumption current including the oscillation circuit 3 and frequency divider 4 of the primary side power transmission section 1 is lowered to approximately 80 mA. Under this condition, the test was conducted while the secondary coil L2 was overlappingly close to the primary coil L1 with 2 mm spacing, the results were:

the primary side 5V 0.8 A 5×0.8=1 W the secondary side the load resistance 10Ω 5.2V 520 mA 5.2×0.52=2.7 W accordingly, the electric power transmission efficiency of DC to DC was 2.7÷4=67.5%.

In the case of [Test 2], when the diode bridge DB and the electrolytic capacitor C2 of the secondary side power receiving section 2 were removed and the load R was directly connected to the secondary coil L2, the primary side 5V 0.8 A 5×0.8=4 W the secondary side the load resistance 10Ω AC voltage execution value 5.66V 5.66×5.66÷10≈3.2 W accordingly, the electric power transmission efficiency of DC to AC was 3.2÷4=80%.

[Test 3]

Except two capacitors C1 and C1a, each electrostatic capacity 0.06 µF, arranged on both sides of the primary coil L1 in series sandwiching the primary coil L1, the test was conducted under the same condition as the [Test 1], and the results were entirely the same as the [Test 1].

In the electric power transmission device configured as described above, as apparent from the above-mentioned test results, high electric power transmission efficiency of practical level can be obtained and thus reduction in size and weight and electric power saving can be easily realized. Further, when the diode bridge DB and the electrolytic capacitor C2 of the secondary side power receiving section 2 were removed; the electric power transmission efficiency was increased. This is because that the electric power to be transmitted of the secondary coil L2 is so low that the proportion of rectification loss due to voltage drop of the diode of the diode bridge DB appears remarkably. It shows that, in the case of much larger transmission of the electric power, the proportion of rectification loss is lowered, thus the electric power transmission efficiency further increases.

The primary side power transmission section 1 of the electric power transmission device configured as described above, as shown in FIG. 1, includes phase detection circuit 9 for detecting a voltage phase generated at the primary coil L1; and a control circuit 10 for outputting a first and second control signals with respect to the oscillator 3 to control an amount of electric power to be supplied to the primary coil L1 based on the output of the phase detection circuit 9. The phase detection circuit 9 inputs the voltage of the primary coil L1 from the point B of the primary coil L1 side of the capacitor C1 (between the capacitor C1 and the primary coil L1) and detects the voltage phase generated at the primary coil L1 by comparing with the output voltage phase of the frequency divider 4. The voltage phase generated at the primary coil L1, comparing with the voltage phase to be supplied to the primary coil L1, i.e., the voltage phase of the frequency divided signal outputted from the frequency divider 4, delays by an induction reactance when no-loading; becomes the same phase by the series resonance when a normal load R being electric power transmission subject; and advances by capacity reactance when a foreign material load being conductive material capable of electric power transmission though not being electric power transmission subject. Then, the control circuit 10 inputs the frequency divided signal outputted from the frequency divider 4 and the output signal of the phase detection circuit 9; compares the reference phase (phase of the frequency divided signal voltage outputted from the frequency divider 4) with the detection phase (phase of the voltage generated at the primary coil L1 detected by the phase detection circuit 9); determines as no load when the detected phase delays compared to the reference phase and determines as the foreign material load when it advances; in either such case, outputs a first control signal to the oscillator 3 to intermittently supply electric power to the primary coil L1 at predetermined intervals during predetermined time only and determines as normal load R when the same phase; and outputs a second control signal to the primary coil L1 to continuously supply electric power.

In the configuration described above, the control circuit 10 outputs the first control signal to the oscillator 3 as a standby mode. The oscillator 3 has an output which is clamped at predetermined intervals during predetermined time only at the timing of either L level or H level (L level or H level that the output connected to the primary coil L1 via the capacitor C1 becomes ON state) according to the first control signal. The signal (sampling signal) from the oscillator 3 is divided by the frequency divider 4 and inputted in reverse phase to each of the C-MOSFET circuits 5A and 5B of the driving bridge circuit via the inverter circuit 5C, whereby alternating current electric power (high frequency electric power) is supplied to the primary coil L1 at predetermined intervals during predetermined time only. Then, the control circuit 10 compares the reference phase being the phase of the frequency divided signal voltage outputted from the frequency divider 4 with the detection phase being the phase of the voltage generated at the primary coil L1, the detection phase being detected by the phase detection circuit 9; and if normal load R, the second control signal is outputted to the oscillator 3 to move to an active mode. In the active mode, the oscillator 3 continuously outputs a predetermined frequency signal; this signal (active operation signal) from the oscillator 3 is divided by the frequency divider 4; and a frequency divided signal (rectangular wave) of the resonance frequency fs2 of the series resonance circuit 7 outputted from the frequency divider 4 is inputted in reverse phase to each of the C-MOSFET circuits 5A and 5B of the driving bridge circuit 5 via the inverter circuit 5C, whereby alternating current electric power (high frequency electric power) is continuously supplied to the primary coil L1. Further, in the active mode, the control circuit 10 compares the reference phase being the phase of the frequency divided signal voltage outputted from the frequency divider 4 with the detection phase being the phase of the voltage generated at the primary coil L1, the detection phase being detected by the phase detection circuit 9; and if no load or abnormal load, i.e., if not normal load R, the second control signal is outputted to the oscillator 3 to move to a standby mode.

Consequently, the electric power transmission device configured as described above, detects whether the presence or absence of a load, a normal load R, or a foreign material load except the normal load at the primary side power transmission section 1, and can transmit electric power to the normal load only, thereby preventing electric power from being transmitted to a metal placed adjacent to the primary coil L1 to heat, for example. Therefore, useless electric power consumption can be suppressed and the risk of unintentional transmission of electric power can be avoided.

The primary side power transmission section 1 of the electric power transmission device configured as described above, as shown in FIG. 1, includes an amplitude detection circuit 11 for detecting amplitude as well as the phase detection circuit 9 for detecting the phase of the voltage generated at the primary coil L1. The amplitude detection circuit 11, similarly to the phase detection circuit 9, inputs the voltage of the primary coil L1 from the point B of the primary coil L1 side of the capacitor C1 (between the capacitor C1 and the primary coil L1) and detects amplitude (magnitude) of the voltage generated at the primary coil L1 by comparing it with the predetermined reference voltage value. The amplitude of the voltage generated at the primary coil L1 becomes large compared to the case of the normal load R being electric power transmission subject when a foreign material load being conductive material capable of electric power transmission though not being electric power transmission subject. Then, the control circuit 10 inputs the frequency divided signal outputted from the frequency divider 4 and the output signal of the amplitude detection circuit 11 as well as the output signal of the phase detection circuit 9; in parallel with the phase, compares the predetermined reference amplitude value with the detection amplitude value (amplitude value of the voltage generated at the primary coil L1 detected by the amplitude detection circuit 11); and determines as the foreign material load only when the detection phase advances compared to the reference phase and the detection amplitude value becomes more than the reference amplitude value.

In the configuration described above, the control circuit 10 compares the reference phase being the phase of the frequency divided signal voltage outputted from the frequency divider 4 with the detection phase being the phase of the voltage generated at the primary coil L1 detected by phase detection circuit 9; in parallel with this phase, compares the predetermined reference amplitude value with the detection amplitude being amplitude of the voltage generated at the primary coil L1 detected by the amplitude detection circuit 11; and outputs the second control signal to the oscillator 3 to move to an active mode if the reference phase and the detection phase are the same phase and the detection amplitude value is the reference amplitude value or below and a normal load R. Further, in the case that the detection phase delays compared to the reference phase and the detection amplitude value is the reference amplitude value and below as well as no load; and in the case that the detection phase advances compared to the reference phase and the detection amplitude value is the reference amplitude value and above as well as a foreign material load, i.e., if not a normal load R, the second control signal is outputted to the oscillator 3 to move to a standby mode.

Consequently, the electric power transmission device configured as described above, not only the detection of the voltage phase of the primary coil L1 but also the detection of the foreign material load by means of combining the amplitude are conducted, thereby enabling to detect the foreign material load with high accuracy.

The secondary side power receiving section 2 of the electric power transmission device configured as described above, as shown in FIG. 1, includes a secondary side ID output circuit 12 which is connected to the secondary coil L2 and changes loads with respect to electric power based on a predetermined specific secondary side ID signal, for example, 1 bit digital signal. The secondary side ID output circuit 12 operates only for a given length of time when starting electric power transmission to the secondary coil L2 (when moving to the active mode); and conducts to/shuts off a resistance element with small resistance value connected to the load R in parallel with the secondary coil L2 via a driver based on the secondary side ID signal, whereby the voltage of the secondary coil L2 is changed and the voltage of the primary coil L1 is changed in phase with the voltage change of the secondary coil L2. That is, when starting electric power transmission by the active mode, specific information transmission is performed from the secondary coil L2 (secondary side power receiving section 2) to the primary coil L1 (primary side power transmission section 1)

by load modulation. Then, the control circuit 10 confirms the normal load R based on the specific information transmitted to the primary coil L1.

In the configuration described above, when the control circuit 10 outputs the second control signal and moves to the active mode, a voltage fluctuation pattern generated at the primary coil L1 based on the secondary side ID signal inputted via the phase detection circuit 9 and amplitude detection circuit 11 is checked against a voltage fluctuation pattern being the primary ID previously set in the control circuit 10; and by this accordance, the normal load R is reconfirmed and the active mode is maintained. When the normal load R is not confirmed, the second control signal is outputted to the oscillator 3 to move to the standby mode.

Consequently, the electric power transmission device configured as described above can add ID authentication function for confirming the normal load R based on the information transmitted to the primary coil L1; and by this ID authentication function, when a specific load, for example, this device is used for a charger of a cellular phone, electric power can be transmitted to only the cellular phone made by a specific company (electric power is not transmitted to other companies' cellular phones having almost similar receiving function), thereby improving security in electric power transmission owing to non-contact and out of touch.

Regarding the electric power transmission device configured as described above, no load, a normal load, and a foreign material load (40 mm-square, 1 mm thick piece of iron) at the points of A and B shown in the circuit of FIG. 1 and their respective voltage waveforms and current waveforms measured by the use of an oscilloscope (Techtronics Co. Ltd., TDS3032B) are shown in FIG. 5 to FIG. 10 as the measured results.

Figure 5:
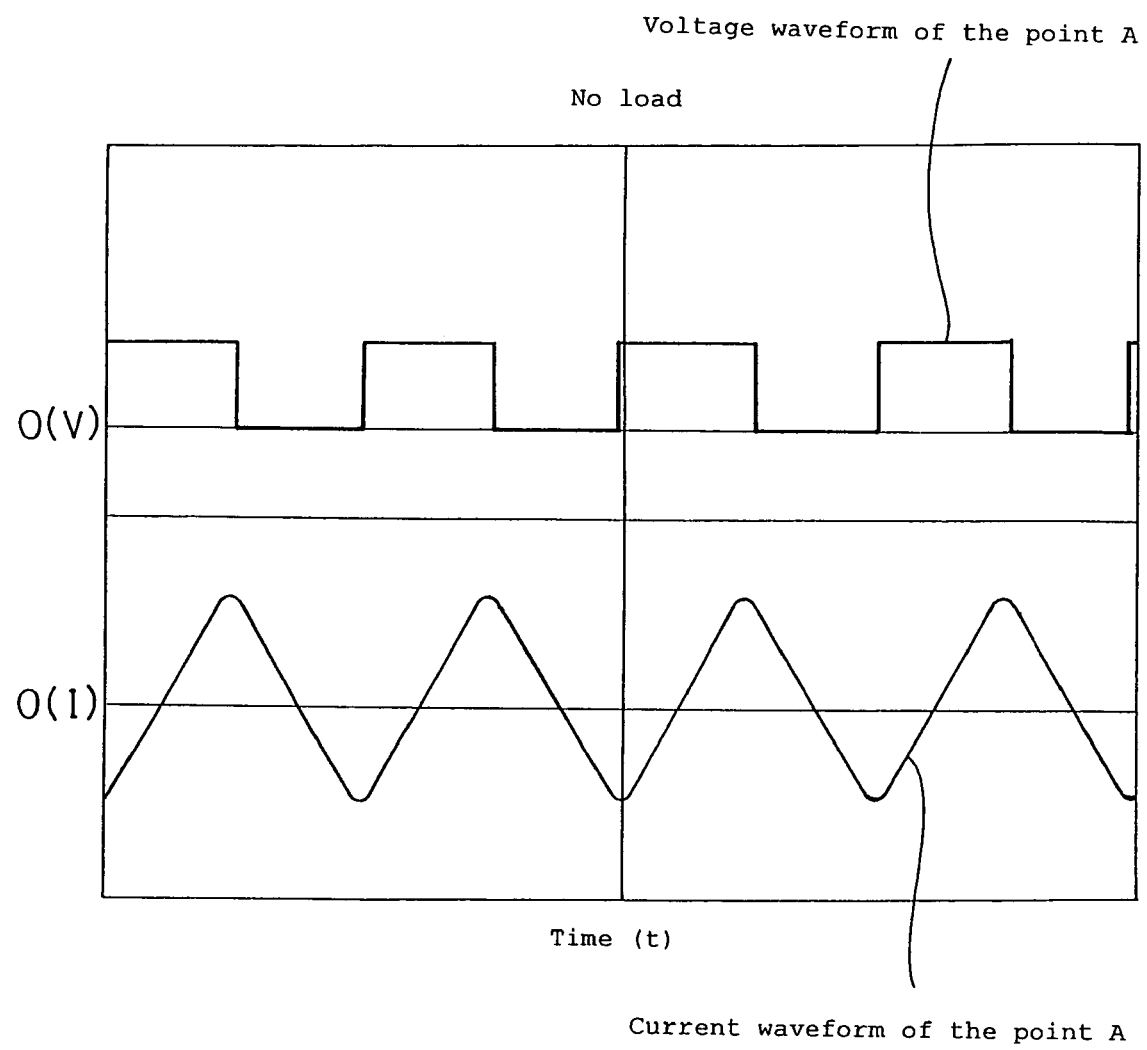
FIG. 5 is a diagram showing no load, the upper of which is a voltage waveform of the point A of FIG. 1, and the lower of which is a current waveform of the point A of FIG. 1.
Figure 6:
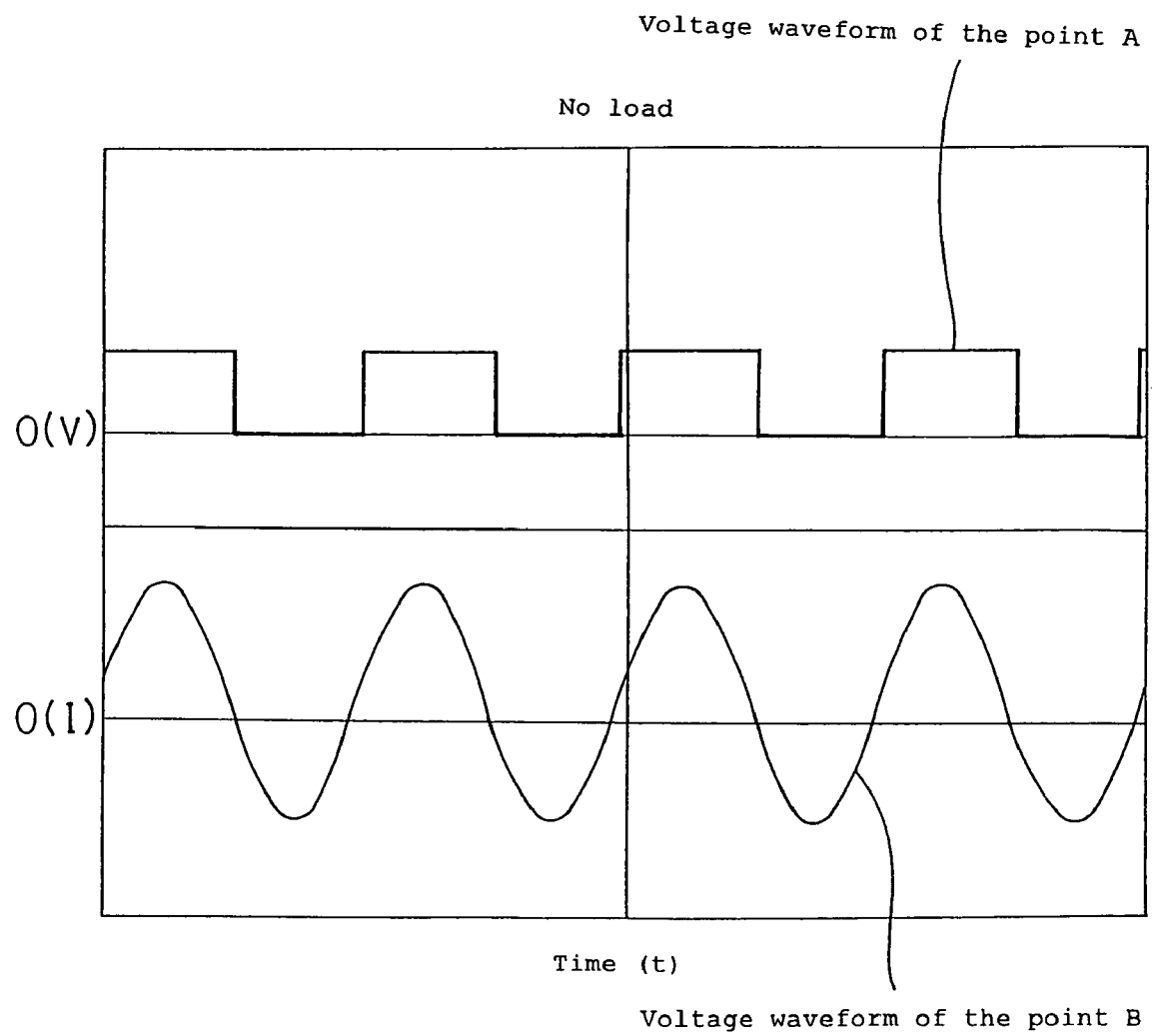
FIG. 6 is a diagram showing no load, the upper of which is a voltage waveform of the point A of FIG. 1, and the lower of which is a voltage waveform of the point B of FIG. 1.
Figure 7:
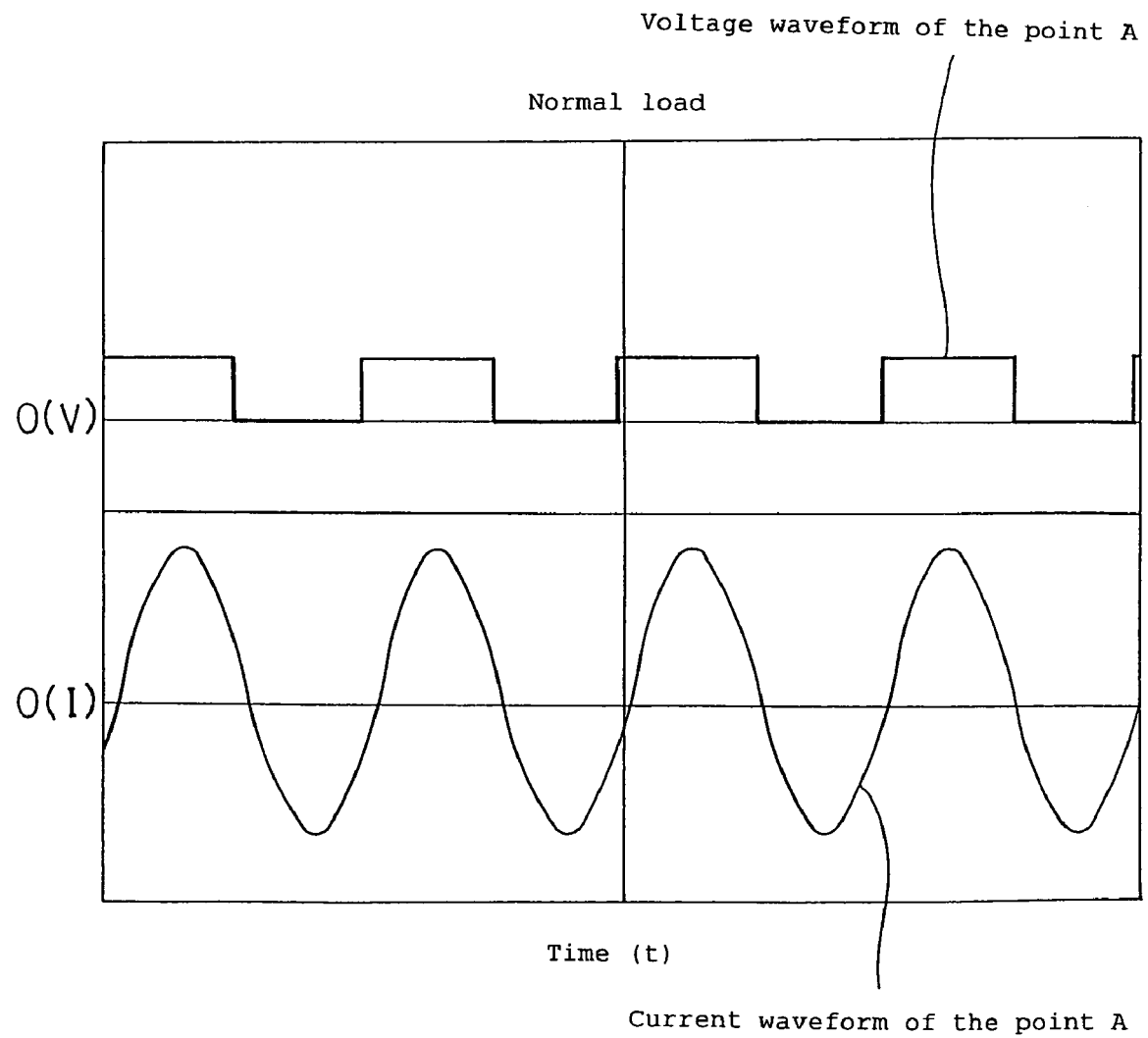
FIG. 7 is a diagram showing a normal load, the upper of which is a voltage waveform of the point A of FIG. 1, and the lower of which is a current waveform of the point A of FIG. 1.
Figure 8:
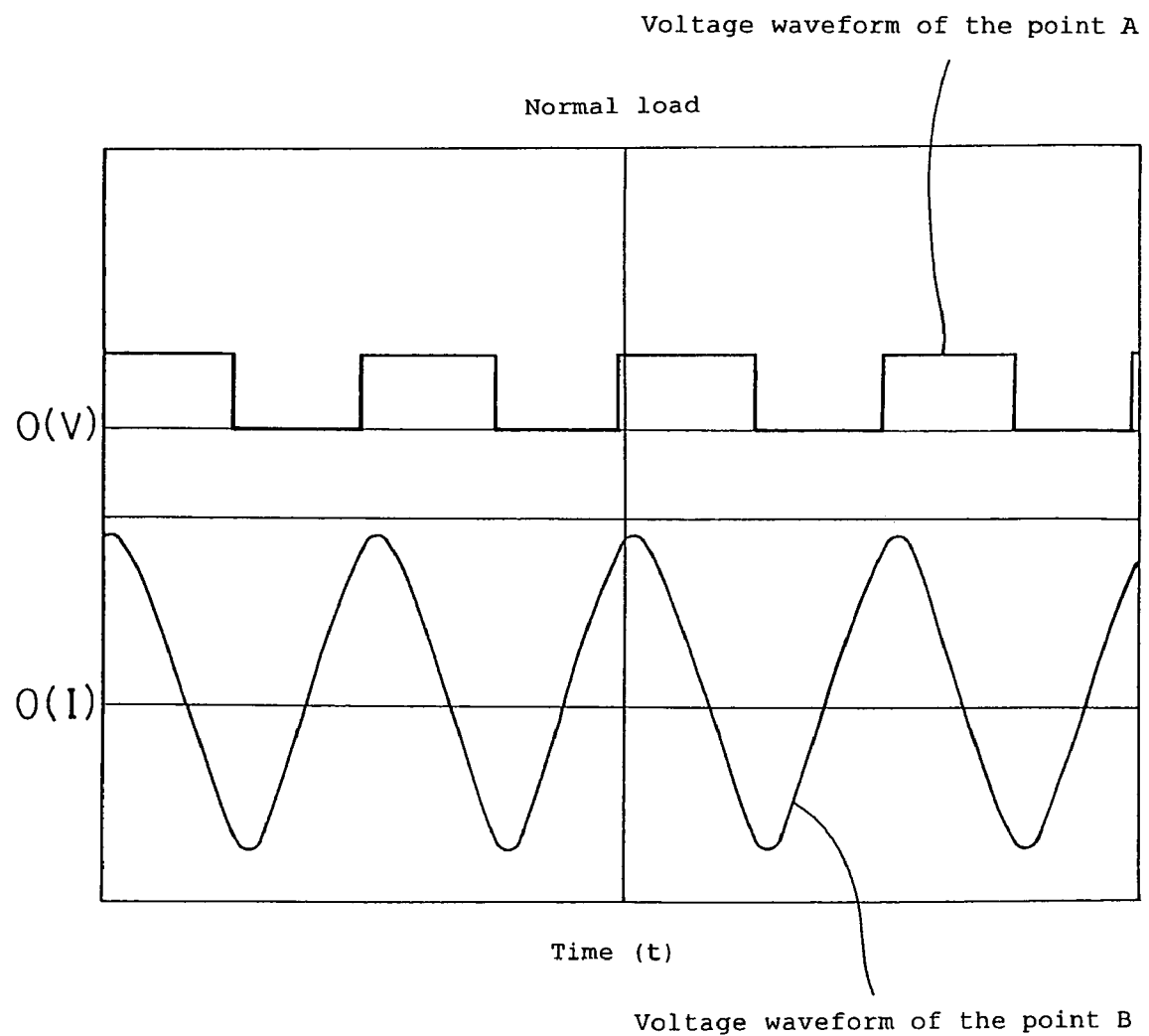
FIG. 8 is a diagram showing a normal load, the upper of which is a voltage waveform of the point A of FIG. 1, and the lower of which is a voltage waveform of the point B of FIG. 1.
Figure 9:
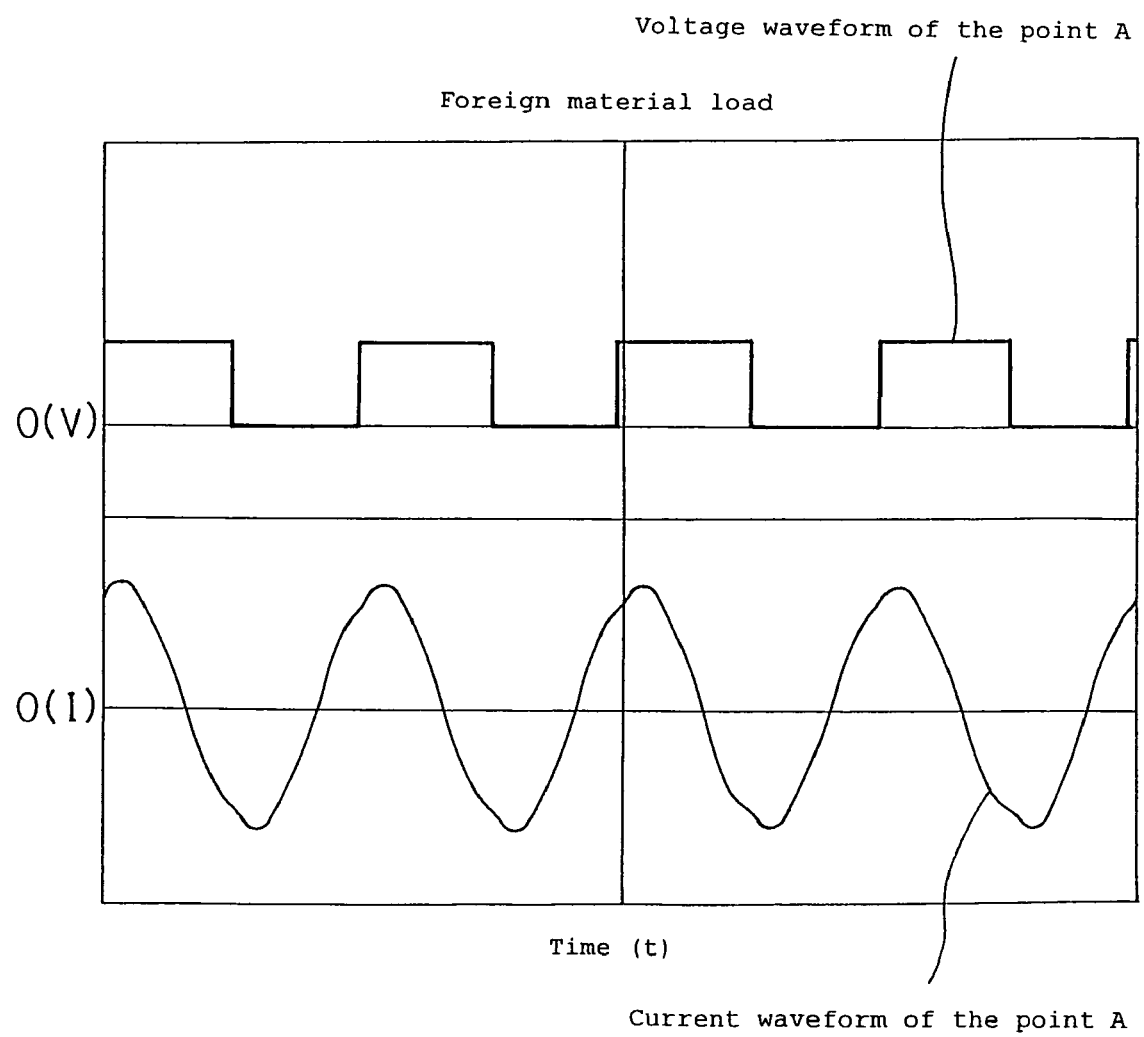
FIG. 9 is a diagram showing a foreign material load, the upper of which is a voltage waveform of the point A of FIG. 1, and the lower of which is a current waveform of the point A of FIG. 1.
Figure 10:
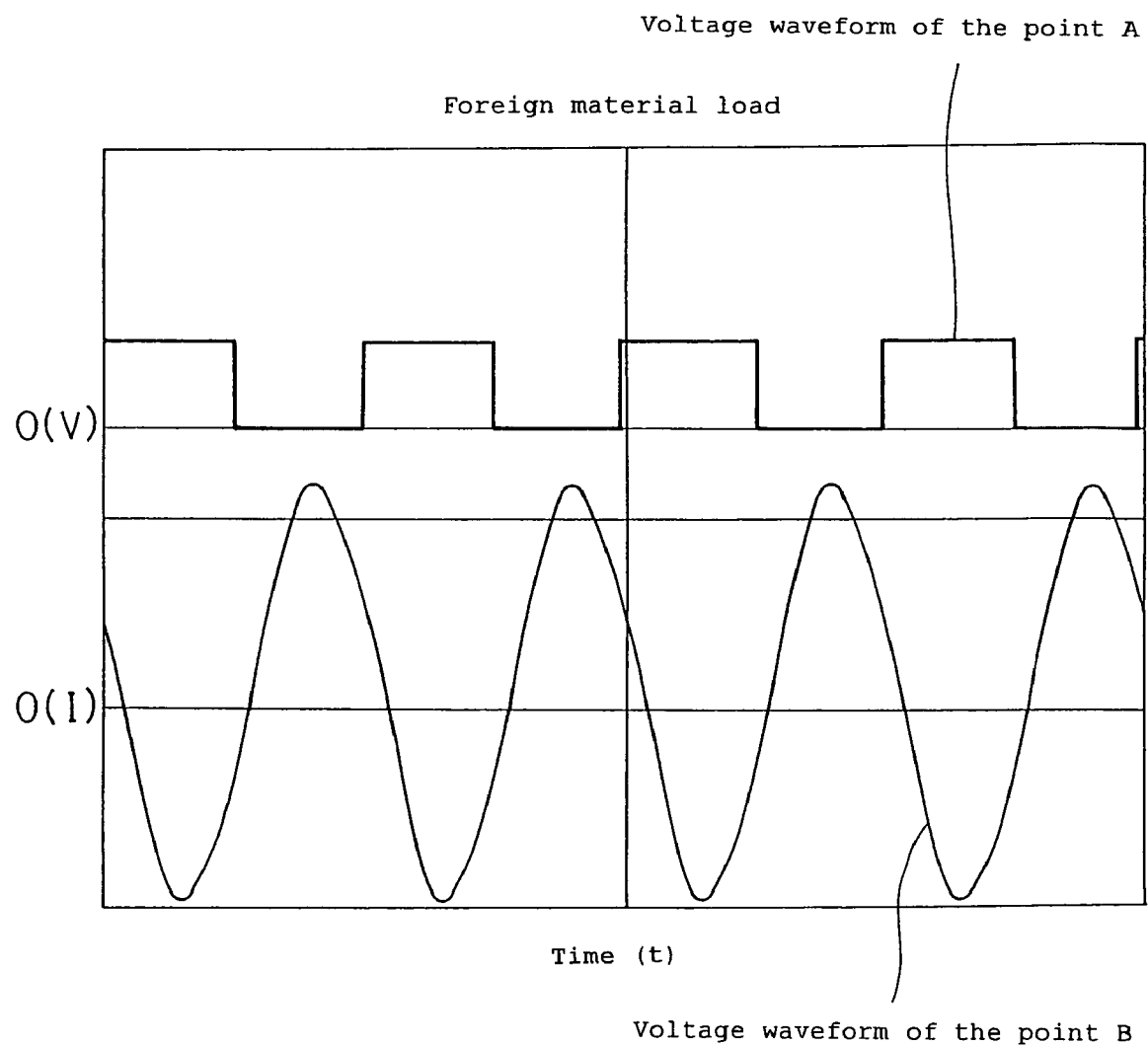
FIG. 10 is a diagram showing a foreign material load, the upper of which is a voltage waveform of the point A of FIG. 1, and the lower of which is a voltage waveform of the point B of FIG. 1.

FIG. 5 is no load, the upper is a voltage waveform of the point A of FIG. 1, and the lower is a current waveform of the point A of FIG. 1; FIG. 6 is no load, the upper is a voltage waveform of the point A of FIG. 1, and the lower is a voltage waveform of the point B of FIG. 1; FIG. 7 is a normal load, the upper is a voltage waveform of the point A of FIG. 1, and the lower is a current waveform of the point A of FIG. 1; FIG. 8 is a normal load, the upper is a voltage waveform of the point A of FIG. 1, and the lower is a voltage waveform of the point B of FIG. 1; FIG. 9 is a foreign material load, the upper is a voltage waveform of the point A of FIG. 1, and the lower is a current waveform of the point A of FIG. 1; and FIG. 10 is a foreign material load, the upper is a voltage waveform of the point A of FIG. 1, and the lower is a voltage waveform of the point B of FIG. 1. First, paying notice to the lower currents of FIG. 5, FIG. 7, and FIG. 9, they show that phases differ compared to respective voltages when no load, a normal load, and a foreign material load; the phase delays by approximately 90 degrees front the driver side when no load; becomes the same phase when the normal load, and advances by approximately 90 degrees when the foreign material load. Next, comparing to the above-mentioned currents with the lower voltages of FIG. 6, FIG. 8, and FIG. 10, they show that though phases differ by approximately 90 degrees; changes due to the loads are the same. This means that the voltage detection at the point B of FIG. 1 and current detection at the point A of FIG. 1 have equivalent meaning. Then, as shown in FIG. 10, from what the voltage extremely rises with respect to the foreign material load, it is understandable that foreign material detection with high accuracy can be performed by combining the voltage amplitude detection.

Now, in the case of detecting current flowing in the primary coil L1, there is a general method that detects voltage across both ends of low resistance element such as shunt resistor while current is applied. In this method, however, current flows in the resistance element, and therefore this element consumes in first a part of electric power which is to be transmitted to the secondary coil L2 and generates joule loss, thus causes heat generation and degradation of electric power transmission efficiency. Whereas, if voltage is detected at the point B of FIG. 1, power consumption can be suppressed by the use of element with high input impedance and it becomes possible to control only the primary side power transmission section 1. Therefore, the phase detection circuit 9 and amplitude detection circuit 11 inputs voltage of the primary coil L1 from the point B of the primary coil L1 side (between the capacitor C1 and the primary coil L1) of the capacitor C1; the control circuit 10 appropriately outputs the first and second control signals to the oscillator 3 based on the output from the phase detection circuit 9 and amplitude detection circuit 11; and operation of the primary side power transmission section 1 is controlled by switching between the standby mode and the active mode.

Consequently, in the electric power transmission device configured as described above, the presence or absence of the load as well as normal load or foreign matter load are detected based on the phase and amplitude of the voltage of the primary side power transmission coil, whereby the detection can be performed with little consumption of electric power and degradation of the electric power transmission efficiency can be prevented.

Figure 4:
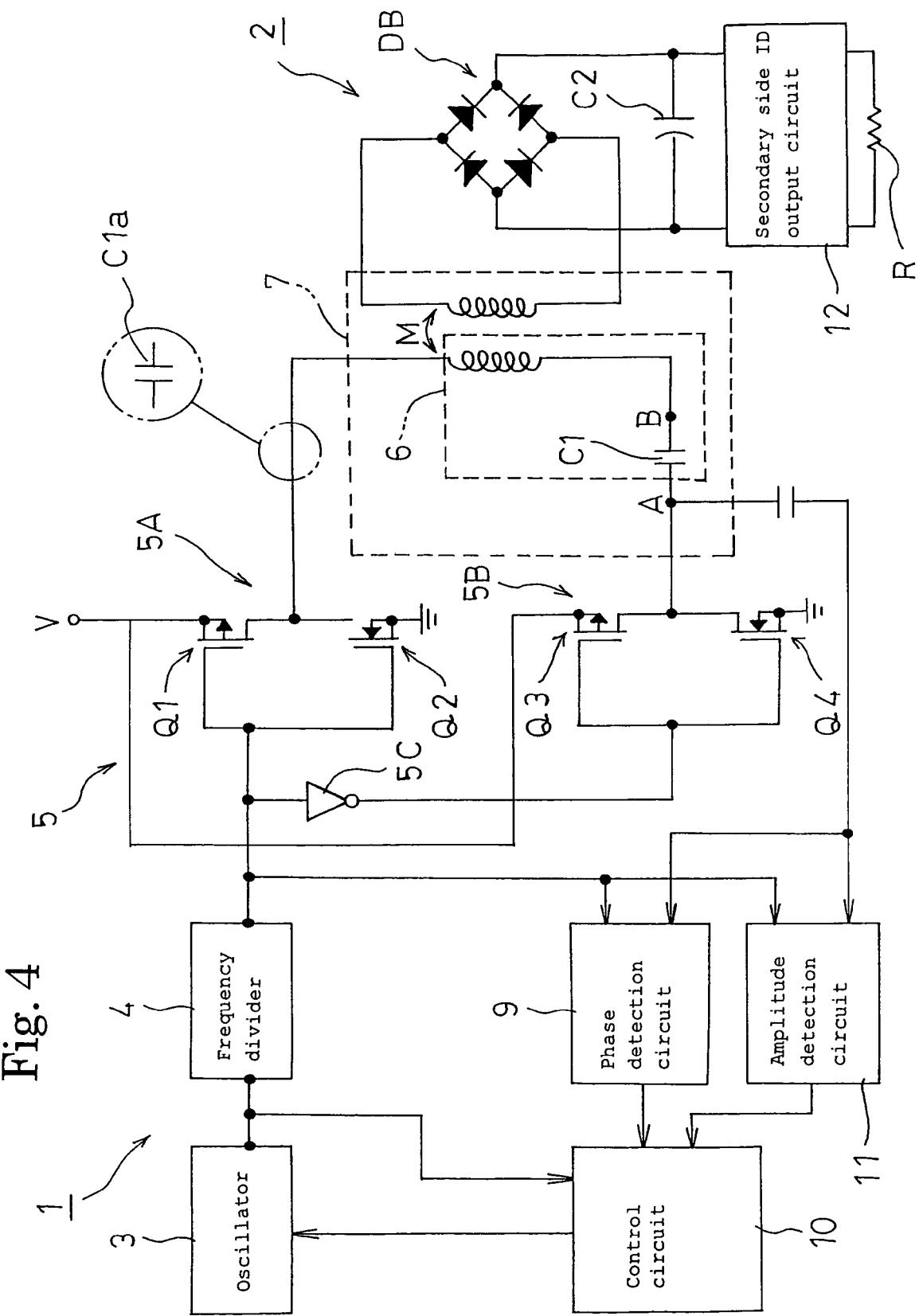
FIG. 4 is a circuit diagram showing another electric power transmission device according to an embodiment of the present invention.

FIG. 4 is a circuit diagram showing another electric power transmission device according to an embodiment of the present invention; the same portions as the circuit shown in FIG. 1 are given the same reference numerals; and their description will not be repeated, but different elements will be described. That is, the phase detection circuit 9 and amplitude detection circuit 11 inputs voltage of the primary coil L1 via a capacitor C3 from the point A opposite to the primary coil L1 side (between the capacitor C1 and the primary coil L1) of the capacitor C1; the control circuit 10 appropriately outputs the first and second control signals to the oscillator 3 based on the output from the phase detection circuit 9 and amplitude detection circuit 11; and operation of the primary side power transmission section 1 is controlled by switching between the standby mode and the active mode. As described above, the voltage detection of the primary coil L1 can be performed from either the point B of the primary coil L1 side (between the capacitor C1 and the primary coil L1) or the point A opposite thereto.

In addition, it is to be expressly understood that the above described embodiments are for the purpose of illustration only of preferred embodiments of the present invention, not intended to limit the scope of the present invention, and various changes may be made without departing from the scope of the invention.

Figure 11:
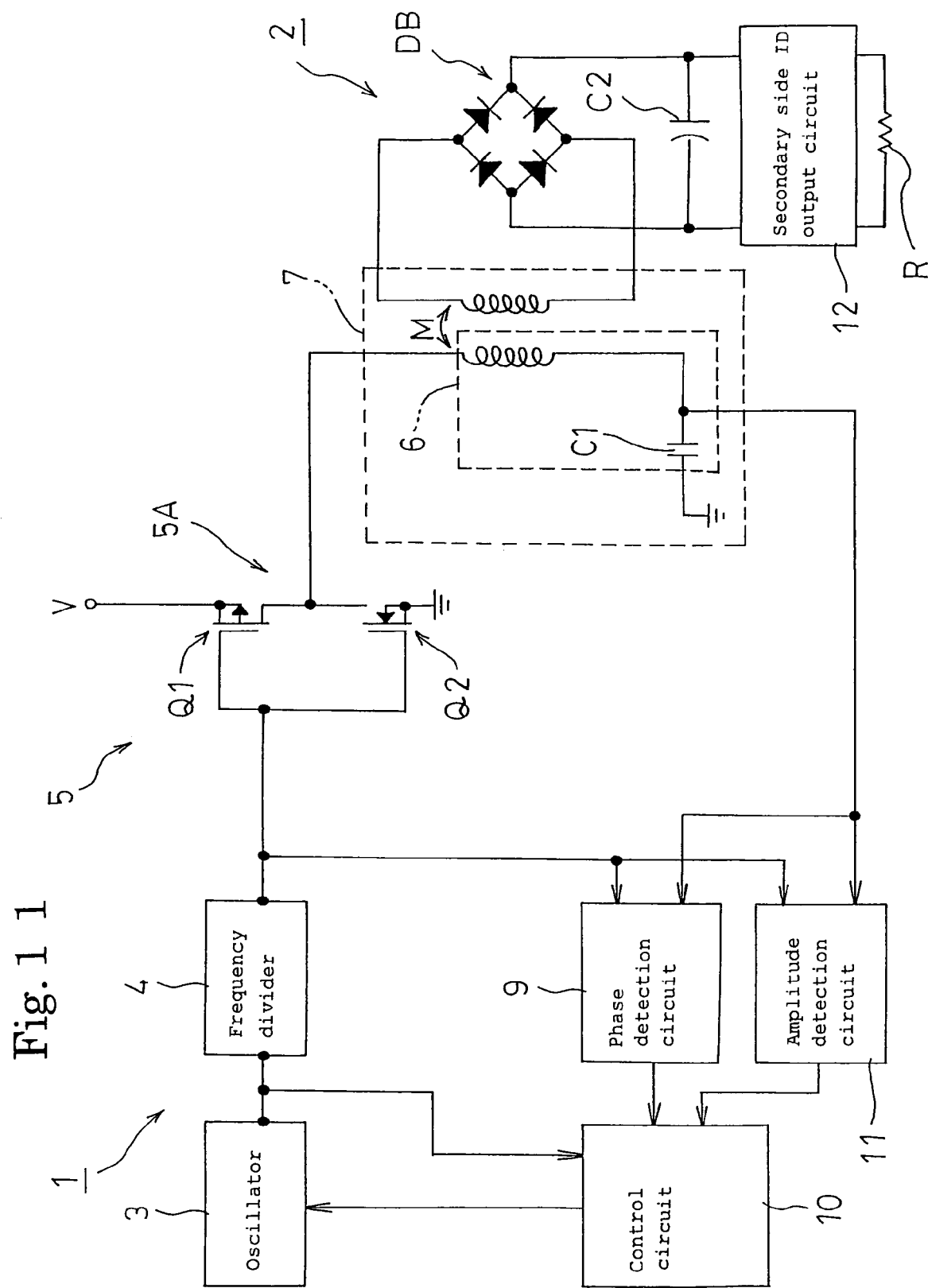
FIG. 11 is a circuit diagram showing further another electric power transmission device according to an embodiment of the present invention.

For example, FIG. 11 is a circuit diagram showing further another electric power transmission device according to an embodiment of the present invention. In the electric power transmission device shown in FIG. 1, two pairs of MOSFETs (4 transistors) combined with P channel and N channel (complementary) are used for feeding means of the primary side power transmission section 1. However, as shown in FIG. 11, a pair of MOSFETs (2 transistors) may be connected to one end of the series resonance circuit 6, the other end of the series resonance circuit 6 is connected to the ground, and electric power may be intermittently supplied to the series resonance circuit 6. Other circuit configuration of the electric power transmission device shown in FIG. 11 is te same as the circuit configuration of the electric power transmission device shown in FIG. 1 and the same reference numerals are given and their description will not be repeated. Further, MOSFET is complementary, but N channel-on-N channel may be used though efficiency may be a little bit reduced.

INDUSTRIAL APPLICABILITY

The present invention can be utilized for electric power transmission with sandwiching glass or plastic, electric power transmission into water, electric power transmission into rotation body, electric power transmission between electronics devices, and multiple electric power transmission from a primary side power transmission section 1 to plural secondary side power receiving sections 2.

The invention claimed is:

1. An electric power transmission device for magnetically coupling a primary side power transmission coil to a secondary side power receiving coil and for transmitting electric power from said primary side power transmission coil to said secondary side power receiving coil via a non-contact and out of touch, said electric power transmission device comprising:
    at least one capacitor connected in series to said primary side power transmission coil, for converting a voltage which is to be supplied to said primary side power transmission coil into an AC voltage and being stepped up, and for configuring a series resonance circuit which includes a mutual inductance by said secondary side power receiving coil,
    phase detection means for detecting a phase of a voltage of said primary side power transmission coil; and
    control means for outputting a control signal to control the amount of electric power that is supplied to said primary side power transmission coil based on an output of said phase detection means, wherein
    a resonance point of said series resonance circuit which includes said mutual inductance by said secondary side power receiving coil is set to a frequency higher than a resonance point of a primary side series resonance circuit which is composed of said primary side power transmission coil and said capacitor, and
    said control means determines as no load when delaying in phase of a voltage of said primary side power transmission coil compared to a voltage to be supplied to said primary side power transmission coil, and determines as a foreign material load when advancing, at this time a first control signal for intermittently supplying electric power to said primary side power transmission coil at predetermined intervals during predetermined time only is outputted; and determines as a normal load when being in the same phase, and a second control signal for continuously supplying electric power to said primary side power transmission coil is outputted.

2. The electric power transmission device according to claim 1, further comprising:
    amplitude detection means for detecting amplitude as well as said phase detection means for detecting a phase of a voltage of said primary side power transmission coil,
    wherein said control means determines as a foreign material load when a phase of a voltage of said primary side power transmission coil advances compared to a voltage to be supplied to said primary side power transmission coil and said amplitude is more than a predetermined reference value.

3. The electric power transmission device according to claim 2, wherein said phase detection means and said amplitude detection means input a voltage of said primary side power transmission coil from said primary side power transmission coil side of said capacitor.

4. The electric power transmission device according to claim 2, wherein said phase detection means and said amplitude detection means input a voltage of said primary side power transmission coil from an opposite side to said primary side power transmission coil of said capacitor via another capacitor.

5. The electric power transmission device according to claim 2, further comprising:
    secondary side ID output means for being connected to said secondary side power receiving coil and for varying a load with respect to electric power based on a predetermined specific secondary side ID signal,
    wherein information transmission is performed to a primary side power receiving coil from said secondary side power receiving coil by load modulation, and
    said control means confirms a normal load based on information transmitted to said primary side power receiving coil.

* * * * *